US 8,724,096 B2

(12) United States Patent
Gosch et al.

(10) Patent No.: US 8,724,096 B2
(45) Date of Patent: May 13, 2014

(54) OPTOELECTRONIC SENSOR AND METHOD FOR THE DETECTION AND DISTANCE DETERMINATION OF OBJECTS

(75) Inventors: Kirsten Gosch, Freiburg (DE); Gerold Feise, Hamburg (DE); Matthias Jägel, Freiburg (DE); Michael Albert, Ettenheim (DE)

(73) Assignee: Sick AG, Waldkirch (DE)

( * ) Notice: Subject to any disclaimer, the term of this patent is extended or adjusted under 35 U.S.C. 154(b) by 255 days.

(21) Appl. No.: 13/330,169

(22) Filed: Dec. 19, 2011

(65) Prior Publication Data

US 2012/0154786 A1 Jun. 21, 2012

(30) Foreign Application Priority Data

Dec. 21, 2010 (DE) .......................... 10 2010 061 382

(51) Int. Cl.
*G01C 3/08* (2006.01)
(52) U.S. Cl.
USPC .......... 356/5.01; 356/3.01; 356/4.01; 356/5.1
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS 7,158,217 B2    1/2007  Hoashi et al.
2004/0169840 A1*  9/2004  Hoashi et al. ................ 356/4.01

FOREIGN PATENT DOCUMENTS

EP    1 522 870 A1    4/2005

OTHER PUBLICATIONS

German Examination Report, in the counterpart Application No. 10 2010 061 382.7, received Sep. 12, 2011, nine (9) pages.

* cited by examiner

*Primary Examiner* — Luke Ratcliffe
(74) *Attorney, Agent, or Firm* — Nath, Goldberg & Meyer; Jerald L. Meyer (57) ABSTRACT

An optoelectronic sensor for the detection and distance determination of objects in a monitoring area is provided having a light transmitter for transmitting a plurality of light pulses, a rotatable deflecting unit, an angle detector, a light receiver, and an evaluation unit which is configured to collect a plurality of reception pulses in a time histogram to determine the light time of flight from the sensor to an object. The evaluation unit is configured to select a respective group of reception pulses that is collected in a histogram based on the angular position signal and to assign the measured value for the object distance determined from the histogram of the group to a detection angle identified by the angular position signal.

21 Claims, 5 Drawing Sheets

OPTOELECTRONIC SENSOR AND METHOD FOR THE DETECTION AND DISTANCE DETERMINATION OF OBJECTS

The invention relates to an optoelectronic sensor, in particular a laser scanner, and a method for the detection and distance determination of objects according to the preamble of claims 1 and 21, respectively.

Optoelectronic systems and in particular laser scanners are suitable for distance measurements needing a large horizontal angular range of the measurement system. In a laser scanner, a light beam generated by a laser sweeps periodically over a monitoring area with help of a deflecting unit. The light is remitted by objects in the monitoring area and evaluated in the scanner. The angular position of the object is determined from the angular position of the deflecting unit, and additionally the distance of the object from the laser scanner is determined from the light time of flight and using the speed of light.

With the angle and distance information, the position of the object in the monitoring area is detected in two-dimensional polar coordinates. From that, the position of objects or their contour can be determined. The third spatial coordinate can also be detected by a relative motion in a transverse direction, for example by an additional movement degree of freedom of the deflecting unit in the laser scanner, or by moving the object relative to the laser scanner. In this manner, three-dimensional contours can also be measured.

Apart from such measurement applications, laser scanners are also used in safety technology for monitoring a source of danger, such as a dangerous machine. One such safety laser scanner is known from DE 43 40 756 A1. There, a protected field is monitored that is no to be entered by personnel during operation of the machine. If the laser scanner detects a forbidden intrusion into the protected field, such as a leg of an operator, it triggers an emergency stop of the machine. Other intrusions into the protected field, for example by static parts of machines, may previously be taught as admissible. Often, warning fields are defined in front of the protected fields, where intrusions at first trigger only a warning in order to prevent the intrusion into the protected field and the resulting safeguarding in time and to increase the availability of the machine. Safety laser scanners are usually pulse-based.

Sensors used in safety technology must work particularly reliable and therefore meet strong safety requirement, for example the EN13849 standard for machine safety and the device standard EN61496 for contactless protective devices. To satisfy these safety standards, a number of measures have to be taken, like a safe electronic evaluation by redundant or diversified electronics, testing and monitoring of functions or in particular monitoring the contamination of optical components, such as a front screen, and/or providing test targets of a defined remission that have to be detected at corresponding scanning angles.

For conventional laser scanners, two basic principles for the determination of the light time of flight are known. Phase-based methods modulate the continuous transmission light and evaluate the phase between the transmitted and the received light. In pulse-based methods or pulse time of flight methods the transmitter operates in a single pulse mode with relatively high pulse energies, and the laser scanner measures object distances based on the time of flight from transmission to reception of an individual light pulse.

A disadvantage of a pulse-based method is that usually a high transmission power and a very sensitive receiver are needed for a significant measurement range. This increases the required space and manufacturing costs in particular for the receiver, as for example an avalanche photo diode including a high voltage generator is needed. On the other hand, a phase-based method with modulation of a continuous wave laser has the disadvantage that there is only a limited unambiguous range of typically a few meters. At the same time, the optical output power of the transmitter is usually low in this method, so that in particular with additional external interference only a low signal-to-noise ratio is achieved. The method has a low robustness against external light and a very limited dynamic range.

It is known from one-dimensional distance sensors to determine the light time of flight from a plurality of individual measurements. One such method is described in EP 1 522 870 A1. This document also mentions application in a scanner, and it points out in this context that a larger average depth can be achieved by a slower rotation, i.e. a lower scanning frequency. However, apart from this concluding remark, the document does not contain any information on how to determine an angularly resolved distance measurement from individual measurements.

A particularly efficient and accurate averaging method for a one dimensional distance sensor is presented in DE 10 2007 013 714 A1. Therein, a plurality of individual measurements is converted into a bipolar signal by analog preprocessing and afterwards binarized and collected in a histogram. From the histogram, the light time of flight is determined. EP 2 189 805, EP 2 189 804, and EP 2 189 814 are based on this method and mention the applicability for a scanning system without going into the practical implementation.

It is therefore an object of the invention to use a measurement based on a statistical evaluation of multiple transmission pulses for a robust, angularly resolved distance measurement.

This object is satisfied by an optoelectronic sensor according to claim 1 and a method for the detection and distance determination according to claim 21. The invention starts from the averaging methods known in the prior art and mentioned in the introduction which form a third class of light time of flight measurements in addition to single pulse time of flight methods and phase-based methods. Then, the basic idea of the invention is to provide an appropriate grouping of multiple pulses in a common histogram in order to achieve a quasi-continuous scanning at the desired angular resolution. This assignment of multiple individual pulses to specific detection angles provides robustness against rotational speed changes of the deflecting unit that are intentional or caused by interference.

The invention has the advantage that a very cost-effective and small sensor with a large horizontal field of view or angular range is formed whose measurement accuracy is particularly high even under adverse conditions. The multiple pulse method according to the invention has a significantly larger unambiguous range and lower susceptibility to interference, because even at a very unfavorable signal-to-noise ratio accurate measurements are still possible due to the statistical evaluation.

Moreover, use of a multiple pulse method in a scanning system has advantages that are not relevant for a simple one-dimensional distance sensor. In contrast to the pulse-based methods usually used in scanners, a quasi-continuous scanning and therefore scanning with practically no gaps of the entire angular range is enabled, and a number of customizing options are made accessible. This allows satisfying specific measurement requirements, or it is possible to respond to interference, such as fluctuations of the rotational speed arising in driverless transport systems or driving assistance by vibration.

The angle encoding unit preferably provides angular position signals of a preset angular resolution. Here and in the following, a preferred feature refers to a feature that is advantageous, but completely optional. The angular resolution may correspond directly to an equidistant, uniform incremental coding of an angular encoder disk. It is also possible to determine a different uniform or non-uniform angular resolution from the actually measured angular position by interpolation or extrapolation.

The angular position signal physically measured by the angle encoding unit or determined from its signals is used as a kind of angular trigger in the simplest case, after which a desired number of subsequent reception pulses form the group. Alternatively, a different assignment can be made, for example with the angular position signal at the end or any other position within the group of reception pulses.

The evaluation unit is preferably configured to select a preset number of reception pulses for a group to a respective angular position signal. This number is the same for all angular position signals in a preferred embodiment, so that a histogram with an identical number of measurement repetitions is formed for each detection angle. It is not mandatory that the reception pulses of a group directly follow one another. For example, the reception pulses may be alternately assigned to two different groups. This may be used to alternately transmit pulses of high and low power. Then, one measured value from a scan with high power for targets of low remission is provided, and one measured value from a scan with low power for a target of strong remission, like a reflector, avoiding overamplification or saturation. Preferably, the time distance between two individual light pulses is constant, i.e. the light transmitter operates at a constant repetition frequency. Alternatively, the individual light pulses are provided with an individual time offset to distribute the scans on the time axis and reduce artifacts of a discrete grid, so that the individual light pulses have a constant repetition frequency only in their mean.

The number of individual light pulses and the time difference between two respective individual light pulses is preferably small enough to allow a time buffer between the last reception pulse of a group and the subsequent angel position signal. Here, only a smaller number of reception pulses are evaluated than it would be possible on optimal use of the time budget between two angular position signals. This compensates for fluctuations in the rotational speed and ensures that the group of reception pulses is complete before the subsequent angular position signal. Preferably, only as many individual light pulses are generated after an angular position signal as are evaluated. This leads to transmission breaks during the time buffer. Alternatively, individual light pulses are transmitted continuously, but are not evaluated during the time buffer.

As an alternative for a time buffer, the existing group is completed with every new angular position signal, and a new group is started. Then sometimes, in particular if the rotational speed changes, the number of reception pulses in the groups differs from one another. This leads to a differing statistical depth and therefore a range fluctuation in dependence on the detection angle.

The evaluation unit is preferably configured to test whether there is an additional angular position signal during the time interval in which the preset number of reception pulses is detected, and to in that case assign the measured value for the object distance determined from the histogram of the group to that angular position signal to which the majority of the reception pulses belong, in particular from which the added time differences to the reception pulses of the group are minimal. Here, no time buffer is provided in order to make use of the maximal measurement information with the highest possible number of individual measurements per revolution of the deflecting unit. In order to nevertheless prevent range fluctuations at different detection angles, the preset number of reception pulses is collected in a group even if there is another intermediate angular position signal which would actually require starting the collecting of a new group for the next measurement. Afterwards, the measured value is assigned to that angular position signal that is the optimal representative for the angular position of the group. As long as the rotational speed behaves as expected, the time intervals between two angular position signals and the preset number of reception pulses in a group are preferably matched, so that the subsequent assignment is not necessary. On the other hand, it can also happen that through continued delay for collecting the preset number a measured value is assigned to the angular position signal already after the next. For the omitted angular position signal, a measured value can be interpolated.

The evaluation unit preferably comprises at least two evaluation channels to collect reception pulses in each evaluation channel in its own histogram and to determine the light time of flight from the sensor to an object and from that a measured value for the object distance from the histogram. If no specific assignment rules between reception pulses, groups, and angular position signals are provided for the different channels, this leads to a redundant measurement for uncovering hardware errors.

This is of particular relevance in safety technology. At the same time, there is also the freedom to use different grouping in the evaluation channels. This can on the one hand be used for a diversified evaluation which has an even higher robustness than simple redundancy by a different measurement method with the same measurement goal. On the other hand, this can also be used to solve the problems of a changing rotational speed and to gather additional measurement information. Another embodiment evaluates individual light pulses of low transmission power in one evaluation channel and alternately transmitted individual light pulses of high transmission power in the other evaluation channel.

The evaluation channels are preferably configured for an overlapping evaluation, where the evaluation channels alternately select a preset number of reception pulses following an angular position signal for a group. This leads to a scanning without gaps, and there is no longer the necessity of a time buffer or a retrospect assignment to angular position signals that may leave gaps to be filled by interpolation. If in this embodiment an evaluation channel has not yet collected the preset number of reception pulses before the next angular position signal is received, this is not a problem, since the other evaluation channel has already started an overlapping new group. This is done for example alternately with two evaluation channels or, if even more overlap is desired, cyclically in multiple evaluation channels. More overlap can for example be useful if a finer angular resolution is to be achieved at a large measurement range and/or large fluctuations of the rotational speed.

The evaluation channels are preferably configured for a parallel evaluation. This may also be combined with an overlapping evaluation, in particular by means of additional evaluation channels. The evaluation channels are preferably configured to use different criteria for the selection of reception pulses of a group. For example, one evaluation channel may form a large number of groups with a small number of reception pulses and the other evaluation channel forms few groups with a large number of reception groups. The same physical measurement provides both measured values for a low range with a high angular resolution and measured values for a high range with a lower angular resolution. This is but one example for different evaluations. In another example, evaluation channels can use a mutual offset where groups are formed with the same preset number of reception pulses, but where one evaluation channel starts groups with the angular position signal and the other evaluation channels start their groups with equidistant offsets between two angular position signals. This leads to a kind of moving average, with a multiplication of the resolution corresponding to the number of evaluation channels.

The evaluation unit is preferably configured to make the selection of reception pulses to a group with a time delay. This achieves only a slightly delayed near real-time evaluation of the measurement, for example delayed by one scanning period or one half thereof. For usual rotational frequencies of the deflecting unit, only fractions of a second are lost as compared to a real-time evaluation. In exchange for the slight delay, arbitrary and adaptable grouping is possible in retrospect. The reception pulses should bear a time stamp or an angle stamp, so that an assignment of the reception pulse to an angular position remains feasible.

The evaluation unit is preferably configured to adapt the number of reception pulses in a group in dependence on at least one of the detection angle and an object distance previously determined. Different group sizes have the practical implication of different range and angular resolution. If the group size depends on the detection angle, it is possible to form angle sections with a higher range at a lower angular resolution and vice versa, so that a higher flexibility is possible for different applications. An adaptive dependence of the group assignment on an object distance previously determined may for example be used to initially scan the entire monitoring area with a high range and a low angular resolution, but to then reduce the range for already detected objects anywhere or in an angle neighborhood of their detection angle to gain a better angular resolution.

Preferably, an analog preprocessor is provided that comprises a filter to convert the reception pulse into a bipolar preprocessed signal which is fed to an ND converter of the evaluation unit. Light signals are always unipolar, because light impinging on the light receiver can only generate a positive signal. By means of a downstream filter that is made to oscillate by the incident light, for example a band pass filter or a differentiating element, a bipolar signal is generated in which a reception point in time can be determined from a zero crossing by digital signal evaluation after ND conversion. This is by far more precise than locating a peak, because the zero crossing does not depend on the signal intensity, i.e. transmission and ambient parameters. Preferably, an amplifier, in particular a transimpedance amplifier, is arranged downstream or upstream of the filter. In addition, the analog preprocessor preferably comprises a limiting amplifier for amplifying the positive component and the negative component of the bipolar preprocessed signal to a saturation value. The ND converter is preferably a binarizer. This forms a binary reception signal that enables a very effective statistical evaluation with only small resources.

The sensor preferably comprises a parameterization unit to set a higher angular resolution at a lower range of the sensor or vice versa. The parameterization unit can be implemented as a panel on the sensor or as a connection for data transfer. With the additional parameterization, there is a higher flexibility for the requirements of the specific application. The desired setting is implemented by varying the group assignment, where groups collect reception pulses over a smaller or larger angular range, with decreased or increased measurement range, in dependence on the parameterization.

The histogram is preferably initialized with initial values even before collecting reception pulses. The initial values may in particular vary in dependence on the detection angle. This maps an expectation that modifies the measurement result.

The initial values are preferably determined by a calibration measurement in a reference state of the monitoring area. Thus, the expectation is obtained from an initial measurement. The initial values are preferably averaged over a larger number of calibration measurements or otherwise preprocessed. Not the reference values themselves, but their negation is preferably used. A measurement then automatically compensates for the expectation before measurements actually are noted. An example is initialization with a front screen reflection. This is a component of the reception signal that is caused by an internal reflection of the individual light pulses on a front screen of the sensor that affects the measurement. The typical shape of the front screen reflection can be measured in advance, and the histograms are initialized therewith to eliminate this interference from the histograms during measurement. Another example is initialization with a reference scene. Then, the sensor only detects dynamical changes of a known object arrangement. In contrast to initialization with a front screen reflection, that usually affects all histograms in a similar manner, for a reference scene the histograms should preferably be differently initialized in dependence on the detection angle.

The method in accordance with the invention can be further developed in a similar manner with additional features and shows similar advantages. Such advantageous features are described in an exemplary, but not exclusive manner in the subordinate claims following the independent claims.

The invention will be explained in the following also with respect to further advantages and features with reference to exemplary embodiments and the enclosed drawing. The Figures of the drawing show in.

Figure 1:
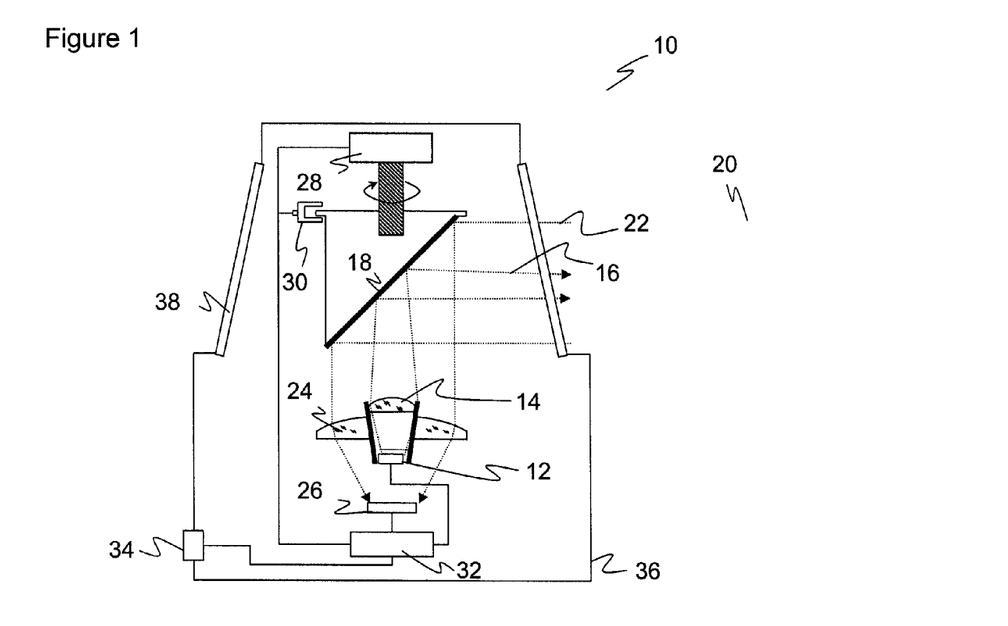
FIG. 1 a schematic cross section of a laser scanner.

FIG. 1 shows a schematic cross section through an optoelectronic sensor in an embodiment as a laser scanner 10. A light transmitter 12, such as a laser light source, generates a transmission light beam 16 with help of transmission optics 14. The transmission light beam 16 is, by means of a deflecting unit 18, transmitted into a monitoring area 20 where it is possibly remitted by an object. The remitted light 22 returns to the laser scanner 10 and is, via the deflecting unit 18 and reception optics 24, detected by a light receiver 26, such as a photo diode or, for higher sensitivity, an avalanche photo diode. In the illustrated laser scanner 10, the light transmitter 12 and its transmission optics are located in a central aperture of the reception optics 24. This is only one example of a possible arrangement. The invention also includes alternative solutions, for example having a separate mirror area for the transmission light beam 16, or using beam splitters The deflecting unit 18 is continuously rotated by a motor 18 at a scanning frequency. Therefore, the transmission light beam 16 scans a plane during each scanning period, i.e. per each complete revolution at the scanning frequency. On the outer circumference of the deflecting unit 18 an angle encoding unit 30 is arranged to detect the respective angular position of the deflecting unit 18. The angle encoding unit 30 is exemplary formed by a gear ring or a slotted disk as the encoding disk and a fork light barrier for the detection.

An evaluation unit 32 is connected to the light transmitter 12, the light receiver 26, the motor 28, and the angle encoding unit 30. In a multiple pulse method which is to be explained in more detail with reference to FIGS. 2 and 3, the light time of flight between transmission of the transmission light beam 16 and reception of remitted light 22 is measured to calculate the distance of a scanned object from the laser scanner 10 using the speed of light. The respective angular position where the transmission light beam 16 has been transmitted is known to the evaluation unit 32 from the angle encoding unit 30. Light time of flight is negligible as compared to usual rotation frequencies of the deflecting unit 18, so that the light transmission beam 16 is practically transmitted at the same angle as the corresponding remitted light 22 is received.

Hence, after each scanning period two-dimensional polar coordinates of all object points in the monitoring area 20 are available via the angle and the distance. The object positions and object contours, respectively, are therefore known and can be output at an interface 34 or displayed by the laser scanner 10. The interface 34 in turn is also used as a parameterization interface where data can be transferred to the evaluation unit 32. Alternatively, a separate parameterization interface can be provided. For applications in safety technology, the interface 34 can be configured to be safe, in particular be a safe output (OSSD, Output Signal Switching Device) for a safety technological stop signal upon detection of a forbidden protected field intrusion.

The laser scanner 10 is housed in a housing 36 comprising a circumferential front screen 38. The geometry of housing 36 and front screen 38 is to be understood as a mere example, as are the design of the transmission and reception channels. A number of alternative concepts are known where the invention is also applicable.

Figure 2:
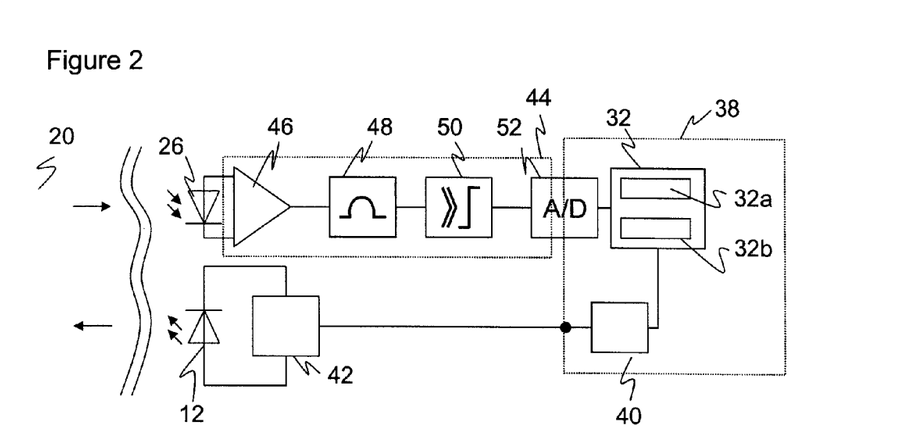
FIG. 2 a block diagram of an analog signal preprocessing and a digital evaluation of the laser scanner according to FIG. 1.

The time of flight is measured with a multiple pulse method that will now be explained with reference to FIGS. 2 and 3.

Here and in the following, the same reference numbers will be used for the same or analogous features. The multiple pulse method is known for one-dimensional range sensors from DE 10 2007 013 714 mentioned in the introduction, which is herewith incorporated in its entirety by reference.

The evaluation unit 32, optionally having two evaluation channels 32a, 32b as shown, is implemented on a digital component 38, such as an FPGA (Field Programmable Gate Array). On a transmission path, the evaluation unit 32, which also has the function of the control of the laser scanner 10, triggers the light transmitter 12 via a delay device 40 and a laser driver circuit 42 to transmit individual light pulses at well-defined points in time. The delay device 40 may be implemented by registers, counters and the like of the FPGA.

The remitted light 22 of an individual light pulse is converted into a reception pulse by the light receiver 26 and fed to the evaluation unit 32 via an analog preprocessor 44 having a preamplifier 46, a filter 48 and a limiting amplifier 50, and via an ND converter 52. Preamplifier 46 and filter 48 may also be arranged in reverse order.

Figure 3:
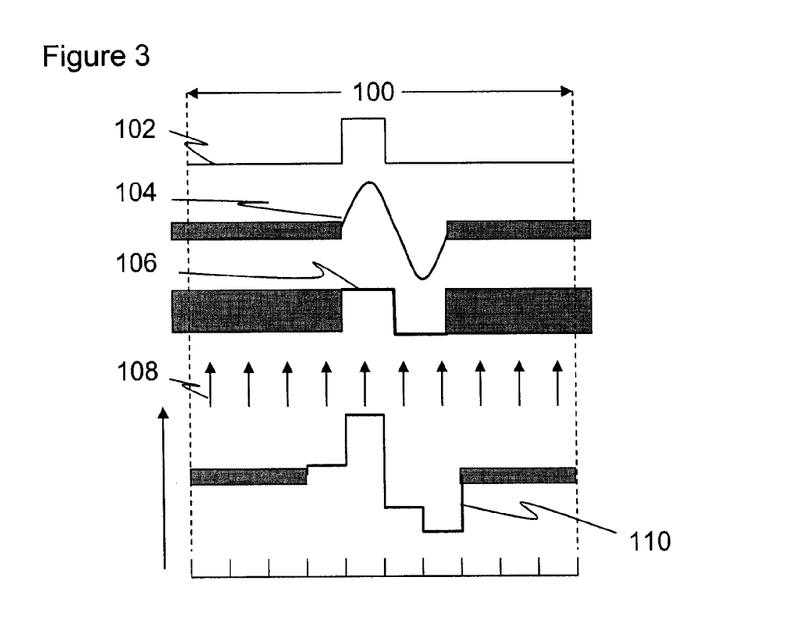
FIG. 3 a representation of the signals in different processing stages of the preprocessing and evaluation according to FIG. 2.

The signals generated in the various intermediate stages are shown in FIG. 3. The light transmitter 12 generates a respective individual light pulse in each measurement period 100 which enables the determination of a precise point in time. A rectangular pulse is suitable for this purpose, but other pulses are also conceivable, such as a Gaussian pulse. The individual light pulse is reflected or remitted in the monitoring area 20 and then converted into an electrical reception pulse 102 by the light receiver 26 and amplified in the transimpedance amplifier 46. The reception pulse 102 is shown in idealized form, under realistic conditions there would also be noise components and shape distortions.

The reception pulse 102 is always a unipolar signal due to the nature of light. In the filter 48, for example a band pass filter, it is converted into a bipolar signal 104, where only the first two oscillations thereof are shown. In FIG. 2, gray rectangles are shown next to the bipolar signal 104 symbolizing the noise level. In the limiting amplifier 50, the bipolar signal 104 is amplified to an extend that, after cutting off, the actual signal becomes a rectangular edge 106, and that the noise level shown by gray rectangles is extended in its amplitude over the entire dynamic range.

The rectangular edge 106 is sampled in the ND converter 52, preferably implemented as a binarizer. The sampling points are shown as arrows 108. The resulting bit sequence is used in the evaluation unit 32 to form a histogram 110. For each bin one accumulator is provided that is only incremented for a corresponding bit value "1". For ideal, noiseless signals only that bin of this histogram 110 would be filled up that matches the position of the rectangular edge 106. However, the noise level, raised by limiting amplifier 34, also fills up the other bins, namely, statistically once every other measurement period 100 due to the randomness of the noise.

If the method as described is iterated and the histogram 110 formed over n measurement periods 100, the bins are filled with approximately the value n/2 due to the noise, where statistical fluctuations are to be added. This value of n/2 corresponds to a signal value zero due to the binarization. From that background, the maximum formed by the positive part of the bipolar signal 104 rises upwards, and the corresponding minimum shows downwards. The zero crossing in between is detected by the evaluation unit 22 in order to determine the reception point in time independently of the signal level.

Due to the statistical evaluation of a plurality of individual measurements the signal-to-noise ratio is raised to such an extent that a robust distance measurement is also possible under adverse ambient conditions. This applies even if an individual amplified reception pulse 102 is so noisy that not difference between the useful signal and the noise can be detected.

FIG. 3 shows only a relevant section of the measurement period 100 around the reception point in time. In order to save memory, this time interval can be located in advance, and then the histogram is only formed for a part of the measurement period 100.

As just described, individual light pulses are transmitted and collected and evaluated by the evaluation unit 32 in a histogram 110 per measured value. Due to the rotation of the deflecting unit 18, each individual light pulse has its own angular offset. The multiple pulse method supports a trade-off between scanning frequency, angular resolution and range. These depend on each other via the statistical depth or average depth, i.e. the number of reception pulses 102 that are respectively combined to a measured value in one histogram 110. A fourth conceivable parameter is the repetition frequency of the individual light pulses which, however, is assumed to be at least approximately constant.

Figure 4A:
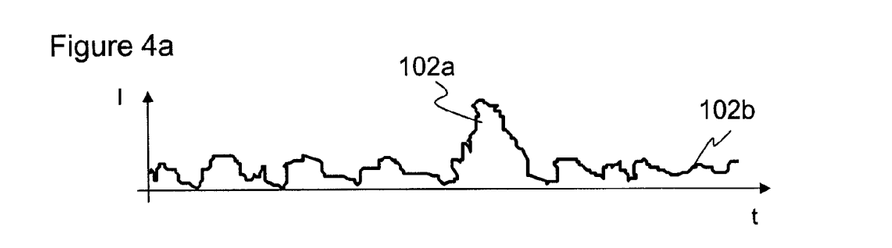
FIG. 4a an exemplary intensity time course of a reception signal recorded by a light receiver of a laser scanner at a low averaging depth and therefore range.
Figure 4B:
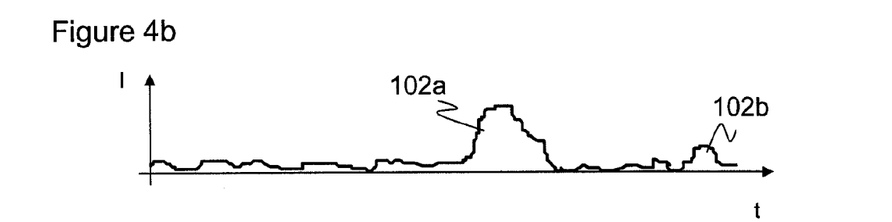
FIG. 4b an intensity course similar to FIG. 4a at a large averaging depth and therefore range.

The trade-off of these parameters is now explained with reference to FIGS. 4 to 6. FIG. 4a shows an intensity time course at a low statistical depth, FIG. 4b at a large statistical depth. A reception pulse 102a in the near range can easily be distinguished from the noise level in both cases. However, a reception pulse 102 in the far range can only be separated from the noise with the larger statistical depth according to FIG. 4b. Consequently, the larger the statistical depth, the higher is the range of the laser scanner 10.

Figure 5A:
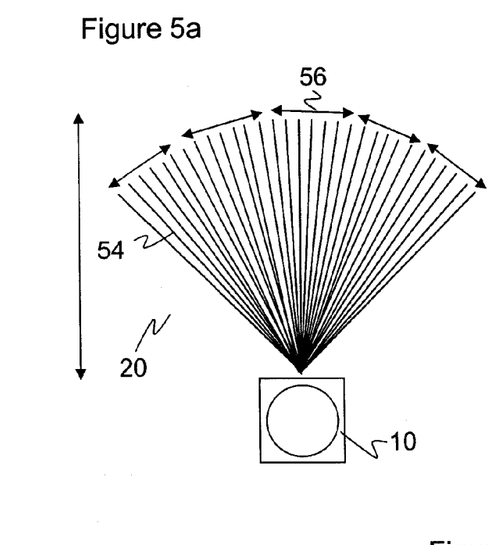
FIG. 5a a schematic top view on the angle distribution of the individual light pulses of a laser scanner at high range and low angular resolution.
Figure 5B:
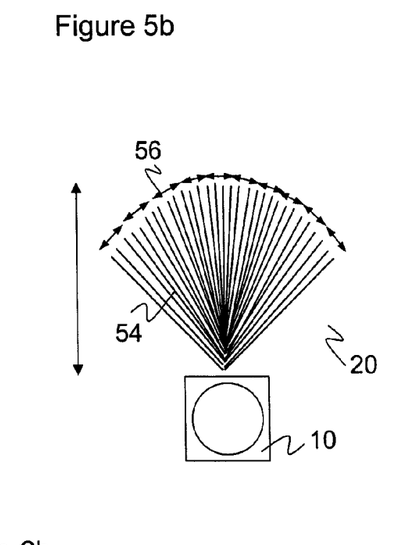
FIG. 5b a representation similar to FIG. 5a at a low range and high angular resolution.
Figure 6A:
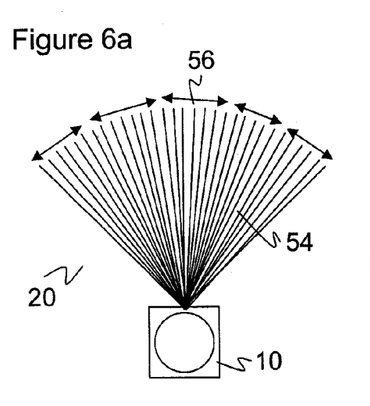
FIG. 6a a schematic top view on the angle distribution of the individual light pulses of a laser scanner as a reference view.
Figure 6B:
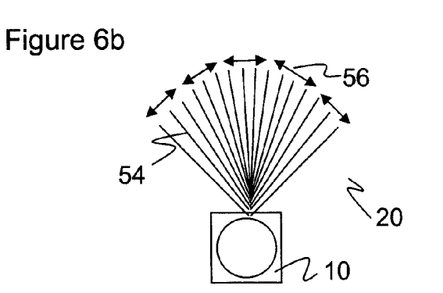
FIG. 6b a representation similar to FIG. 6a at increased scanning frequency and therefore reduced range.
Figure 6C:
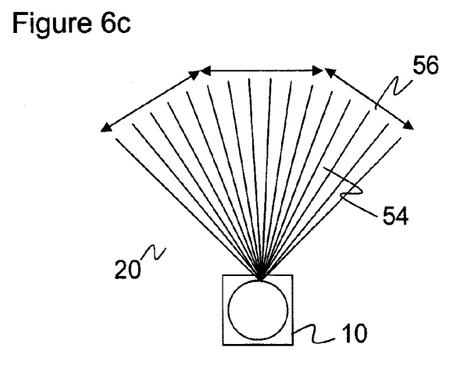
FIG. 6c a representation similar to FIG. 6b at an increased scanning frequency and a reduced angular resolution instead of a reduced range.

FIGS. 5 and 6 each show in a top view the laser scanner 10 and individual light pulses 54 over a part of the scanning period. Those individual light pulses 54 whose corresponding reception pulses 102 are combined in one respective histogram 110 are connected by an arrow 56. In practice, contrary to what is shown, a far larger number of for example several hundred or even more individual light pulses 54 would be transmitted per angular degree.

FIG. 5 illustrates the trade-off of angular resolution and range. In FIG. 5a, the individual light pulses 54 are combined to larger respective groups 56. According to the relationship illustrated in FIG. 4, objects in a relatively high range can therefore still be detected. For that, each group 56 needs a comparably large angular range. If, however, a finer angular resolution is to be achieved as in FIG. 5b, the groups 56 become smaller, and the reduced statistical depth results in a poorer signal-to-noise ratio and thus a reduced range.

A similar trade-off exists for the scanning frequency. FIG. 6a shows a reference for a given scanning frequency. If the scanning frequency is increased, less individual light pulses 54 are within a given angular range. Now, either the angular resolution can be maintained as shown in FIG. 6b. This reduces the range due to the reduced statistical depth. Alternatively, the range can be maintained as in FIG. 6c. However, this reduces the angular resolution, because for a maintained statistical depth individual light pulses 54 have to be collected over a larger angular range. Of course all intermediate stages are conceivable according to this principle, where both range and angular resolution are reduced, but to a smaller extent.

In an embodiment the trade-off is used to allow parameterization of range, scanning frequency, and angular resolution. For example, the user sets one or several of these variables, and the laser scanner 10 adapts the group size via the statistical depth. Adaptive methods are also possible, where range and angular resolution are adaptable. Both a dependence on time and detection angle is possible. For example, a given angular range is detected at a low range and high angular resolution, and the remaining angular range is detected at a high range and a low angular resolution. Another example is a driverless transport system that at first navigates with a coarse angular resolution and high range and switches upon detection of an object to an increasingly better angular resolution while the range is adapted to the object distance which is now known. An additional angle dependency can also be used.

The multiple pulse method operates near-continuously because the light transmitter 12 continuously transmits individual light pulses 54, and a respective group 56 of the reception pulses 102 registered thereafter are combined and collected in a histogram 110, whereupon the next group 56 is evaluated. Possibly, a break for the evaluation itself is required.

In principle, a seamless scanning system is designed that does not have any scanning gaps at any scanning angle. However, depending on the application conditions, the laser scanner 10 is subject to fluctuations in rotational speed of varying degree, for example by vibration or shaking. It can therefore happen that the evaluation for a new measured value in a new histogram 110 would have to start prior to completion of the current measurement.

Figure 7A:
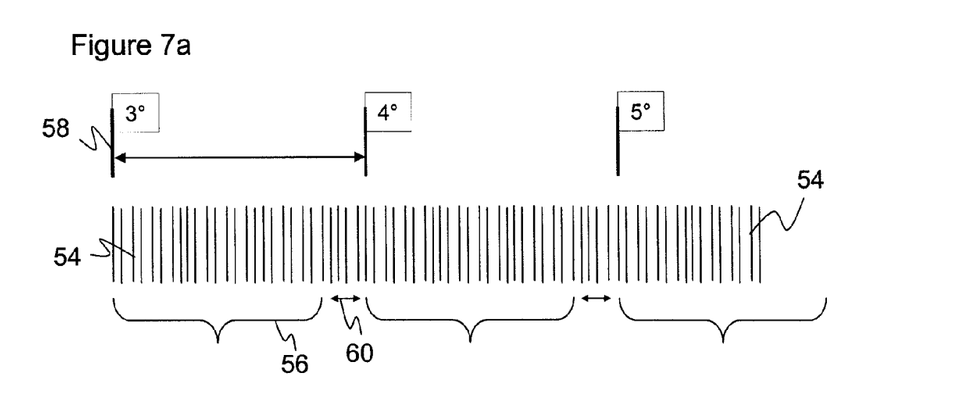
FIG. 7a a temporal superimposition of angular position signal, individual light pulses and their grouping at a regular rotation of the deflecting unit.
Figure 7B:
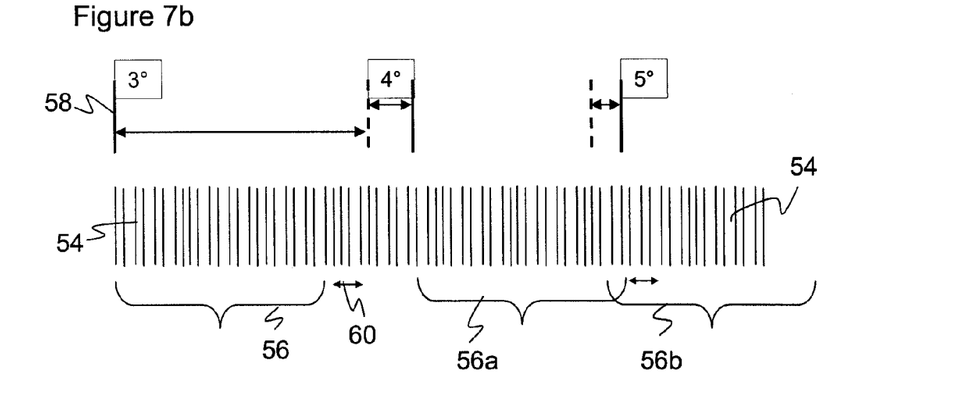
FIG. 7b a representation similar to FIG. 7a at a fluctuation of the rotational speed.

This situation is illustrated in FIG. 7. FIG. 7a shows an idealized case without any fluctuations in rotational speed. The angle encoding unit 30 outputs uniform, equidistant angular position signals 56, and the individual light pulses 54 and their corresponding reception pulses 102, respectively, are combined in groups 56 without overlap. Arrows 60 designate a dead time interval that is required for the evaluation of the histogram 110. In FIG. 7b, the timing is deranged due to a fluctuation in rotational speed. The group 56a at 4° still collects individual light pulses 54 that should already be assigned to the group 56b at 5°.

One possible reason for such wrong assignments is too low a physical resolution of the angle encoding device 30, for example if a slotted disk or a gear ring is used. Then, the angular position signals have to be interpolated and are not available in real-time.

It is therefore sometimes only clear in retrospect that the reception pulses 102 are falsely still collected in a previous histogram 110. A simple solution is to delay the evaluation, i.e. to at first merely store all reception pulses 102 as such and to form groups and statistically evaluate them later. This requires additional storage capacity, and the capability for real-time evaluation is lost. Another simple solution would be to discard the measured value if it turns out that the histogram 110 already contains reception pulses 102 of the subsequent angular range. However, this results in scanning gaps.

Therefore, in another embodiment, the statistical depth is dynamically adapted. In a very simple implementation, the group is completed as soon as a new angular position signal is received, irrespective of the statistical depth that was achieved. According to the trade-off relations explained above, this results in a fluctuation of the measurement range in dependence on the angle, which may still be more easily accepted than a scanning gap.

Usually, the measurement range and thus the statistical depth will be specified in advance. In other words, the number of individual light pulses 54 and their corresponding reception pulses 102 per group 56 is preset. This setting can, as discussed above, still be dynamic, i.e. vary with the angular range and with time, respectively.

To compensate for fluctuations in rotational speed, in another embodiment a buffer is reserved. Between two respective groups, an enlarged zone similar to the dead zone 60 is provided, wherein no reception pulses 102 are added to the histogram 110 in the ideal case of FIG. 7a. If a variation in rotational speed occurs, the buffer is used to collect the preset number of reception pulses 102 prior to the subsequent angular position signal 58. Then, the larger the buffer, the farther the method moves from a near-continuous evaluation.

Figure 8:
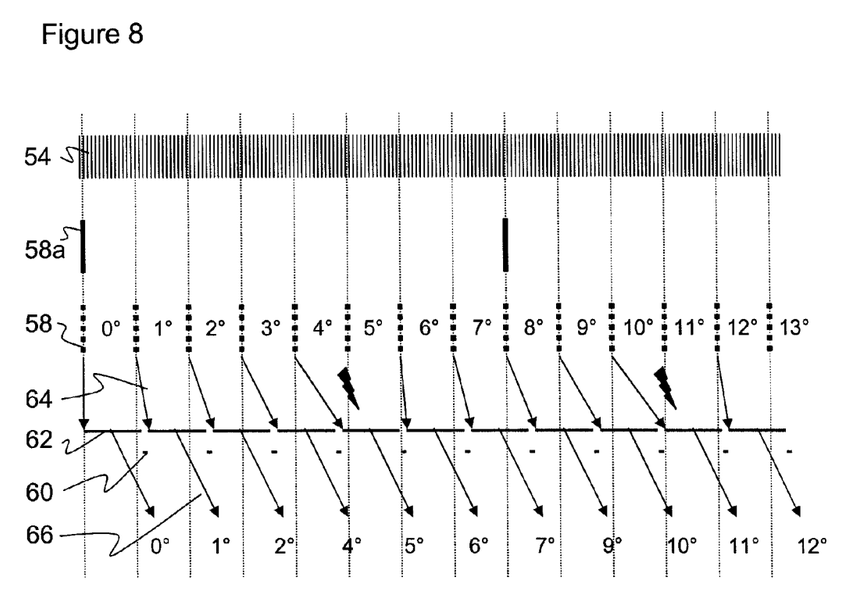
FIG. 8 a temporal superimposition of the individual light pulses, the signals of an angle encoding unit, the angular position signals and angle segments derived therefrom as well as a dynamical assignment of groups of individual light pulses to angle segments.

FIG. 8 shows another embodiment of the invention that can be used to avoid the buffer and/or to consider the case where the buffer is insufficient to cope with the fluctuations in rotational speed. Like in FIG. 7, the upper part of FIG. 8 shows the timing of the individual light pulses 54. Below, the angle signals 58a generated by the angle encoding unit 30 are shown from which the angular position signals 58 with the desired angular resolution are derived by interpolation. Alternatively, the angle encoding unit 30 may directly output a desired angle grid with angular position signals 58.

The noncritical case is if a time interval 62 for collecting the specified number of reception pulses 102 including the dead zone 60 for the evaluation is smaller than the time interval between two angular position signals 58. Then, a measured value is generated, and the subsequent measurement starts with the next angular position signal 58.

However, FIG. 8 shows a case where due to a fluctuation in rotational speed the time interval between two angular position signals 58 does not suffice to collect the required number of reception pulses 102 in a histogram 110. Then, the subsequent measurement is started immediately after a current measurement. This cannot prevent but at least limit the time divergence. The start of each measurement is illustrated by arrows 64. A measured value is assigned in retrospect to that angle segment where the majority, in particular more than 50% of the individual light pulses 54 and their corresponding reception pulses 102 are located. This is illustrated by arrows 66. Consequently, not only the measured value, but also the corresponding angle has to be output.

In case of several subsequent shortened angle segments, angular position signals 58 may exist that do not trigger a new measurement because the previous measurement already used up the entire available time budget. This happens at 5° and at 11° in the example of FIG. 8. At these angular position signals 58, at first no measured values are available. The measured values may, however, be interpolated from the neighboring angular position signals 58. The continuous monitoring without scanning gaps remains intact because individual light pulses 54 for each intermediate angle take part in the measurement. From the perspective of the actual scanning with transmission light beam 16, still a near-continuous scanning has taken place. However, the pulse sequence of the individual light pulses with respect to the rotation angle has been too slow due to the sudden increase in rotational speed than would have been necessary, so that in effect the angular resolution temporarily decreases.

The most accurate evaluation provides multiple evaluation channels 32a, 32b. Then, one evaluation channel 32a continues its histogram generation even over a subsequent angular position signal 58 if necessary, while the other evaluation channel 32b already starts an overlapping additional measurement with the subsequent angular position signal 58 as a trigger. Therefore, the statistical depth and thus the range and angular resolution remain completely unaffected by fluctuations in rotational speed. Merely the independence of the measured values is slightly affected since reception pulses 102 in the overlap range after the subsequent angular position signal 58 contribute twice to both the earlier and later measured value. This does not have any practical implications as all reception pulses 102 still originate from real measurements at the corresponding detection angle.

Multiple evaluation channels 32a, 32b may additionally or alternatively be used to evaluate the identical measurement data, namely reception pulses 102, for several different evaluations in parallel. If this is a redundant or diversified evaluation, this may be used to test the reliability of the evaluation. It is also possible to use different criteria for range and angular resolution in the parallel branches. For example, one measurement with a high range and a low angular resolution and another measurement with a low range and a high angular resolution are made at the same time, and later on the required measurement is selected, or measurements are compared or combined.

The parallel evaluation channels 32a, 32b may also have mutually different time offsets to the angular position signals 58. With that, mutually offset angular scales are ultimately processed, similar to a moving average, which are consecutively aligned to achieve an improved angular resolution. Unlike a moving average, a memory for the individual measurements to remove the respective reception pulses 102 from the histogram 110 upon movement of the averaging window is not required, since each evaluation channel 32a, 32b collects, evaluates and discards its histogram 110.

In the initial state of the histogram 110, it was previously at least implicitly assumed that all bins are empty. It is also possible to instead initialize the histogram 110 with non-zero initial values. These initial values may both be independent and dependent on the angle.

An application is compensation of a front screen reflection that the transmission light beam 16 generates upon leaving the laser scanner 10 through the front screen 38. Other interference, like optical or electrical crosstalk, may also be compensated in an analogous manner. Finally, it is in principle also possible to teach a reference scene by initial values, in particular for static applications, in order to respond to movements or additional objects during operation very fast and reliable.

These interferences can be taught in calibration measurements with the desired angular resolution at the factory or in the field, and the resulting initial values are used with a negative sign to initialize the bins of the histogram during operation upon forming each new histogram. The initial values may be scaled according to the statistical depth used during teaching and operation, respectively. Preferably, the initial values are already taught with the statistical depth to be used later on, but this is not always possible due to the adaptive elements of the invention.

If the reception pulses 102 are collected in a histogram initialized in this manner, the taught and known interference is automatically compensated at a very early stage in the measurement path due to the initial values.

The invention has been described based on embodiments and with reference to the Figures. However, the description should not be understood to restrict the invention to the particular features shown in the Figures. Other combinations of the features that are not explicitly explained or shown are also possible and are within the scope of the invention.

The invention claimed is:

1. An optoelectronic sensor (10) comprising:
   a laser scanner, for the detection and distance determination of objects in a monitoring area (20);
   a light transmitter (12) for transmitting a transmission light beam (16) with a plurality of successive individual light pulses (54);
   a rotatable deflecting unit (18) for periodically deflecting the transmission light beam (16) in the monitoring area (20);

an angle encoding unit (30) for generating angular position signals (58) in dependence on an angle position of the deflecting unit (18);
a light receiver (26) for generating reception pulses (102) from the transmission light reflected or remitted by objects in the monitoring area (20); and
an evaluation unit (32) which is configured to collect a plurality of reception pulses (102) in a time histogram (110) and to determine the light time of flight from the sensor (10) to an object from the histogram (110) and, from that, a measured value for the object distance, wherein the evaluation unit (32) is configured to select a respective group (56) of reception pulses (102) that is collected in a histogram (110) based on the angular position signal (58) and to assign the measured value for the object distance determined from the histogram (110) of the group (56) to a detection angle identified by the angular position signal (58), and
wherein the evaluation unit (32) is configured to make the selection of reception pulses (102) to a group (56) with a time delay.

2. The sensor (10) of claim 1,
wherein the angle encoding unit (30) provides angular position signals (58) of a preset angular resolution.

3. The sensor (10) of claim 1,
wherein the evaluation unit (32) is configured to select a preset number of reception pulses (102) for a group (56) to a respective angular position signal (58).

4. The sensor (10) of claim 3,
wherein the number of individual light pulses (54) and the time difference between two respective individual light pulses (54) is small enough to allow a time buffer between the last reception pulse of a group (56) and the subsequent angel position signal (58).

5. The sensor (10) of claim 3,
wherein the evaluation unit (32) is configured to test whether there is an additional angular position signal (58) during the time interval in which the preset number of reception pulses (102) is detected, and to in that case assign the measured value for the object distance determined from the histogram (110) of the group (56) to that angular position signal (58) to which the majority of the reception pulses (102) belong.

6. The sensor (10) of claim 5,
wherein the evaluation unit (32) is configured to assign the measured value for the object distance determined from the histogram (110) of the group (56) to that angular position signal (58) from which the added time differences to the reception pulses (102) of the group (56) are minimal.

7. The sensor (10) of claim 1,
wherein the evaluation unit (32) comprises at least two evaluation channels (32a, 32b) to collect reception pulses in each evaluation channel in its own histogram (110) and to determine the light time of flight from the sensor (10) to an object and from that a measured value for the object distance from the histogram (110).

8. The sensor (10) of claim 7,
wherein the evaluation channels (32a, 32b) are configured for an overlapping evaluation, where the evaluation channels (32a, 32b) alternately select a preset number of reception pulses (102) following an angular position signal (58) for a group (56).

9. The sensor (10) of claim 7,
wherein the evaluation channels (32a, 32b) are configured for a parallel evaluation.

10. The sensor (10) of claim 7,
wherein the evaluation channels (32a, 32b) are configured to use different criteria for the selection of reception pulses (102) of a group (56).

11. An optoelectronic sensor (10) comprising:
a laser scanner, for the detection and distance determination of objects in a monitoring area (20);
a light transmitter (12) for transmitting a transmission light beam (16) with a plurality of successive individual light pulses (54);
a rotatable deflecting unit (18) for periodically deflecting the transmission light beam (16) in the monitoring area (20);
an angle encoding unit (30) for generating angular position signals (58) in dependence on an angle position of the deflecting unit (18);
a light receiver (26) for generating reception pulses (102) from the transmission light reflected or remitted by objects in the monitoring area (20); and
an evaluation unit (32) which is configured to collect a plurality of reception pulses (102) in a time histogram (110) and to determine the light time of flight from the sensor (10) to an object from the histogram (110) and, from that, a measured value for the object distance,
wherein the evaluation unit (32) is configured to select a respective group (56) of reception pulses (102) that is collected in a histogram (110) based on the angular position signal (58) and to assign the measured value for the object distance determined from the histogram (110) of the group (56) to a detection angle identified by the angular position signal (58), and
wherein the evaluation unit (32) is configured to adapt the number of reception pulses (102) in a group (56) in dependence on at least one of the detection angle and an object distance previously determined.

12. The sensor (10) of claim 1,
wherein an analog preprocessor (44) is provided that comprises a filter (48) to convert the reception pulse (102) into a bipolar preprocessed signal (104) which is fed to an A/D converter (52) of the evaluation unit (32).

13. The sensor (10) of claim 12,
wherein the analog preprocessor (44) comprises a limiting amplifier (50) for amplifying the positive component and the negative component of the bipolar preprocessed signal (104) to a saturation value.

14. The sensor (10) of claim 12,
wherein the A/D converter (52) is a binarizer.

15. The sensor (10) of claim 1,
comprising a parameterization unit (34) to set a higher angular resolution at a lower range of the sensor (10) or vice versa.

16. The sensor (10) of claim 1,
wherein the histogram (110) is initialized with initial values even before collecting reception pulses (102).

17. The sensor (10) of claim 16,
wherein the initial values vary in dependence on the detection angle.

18. The sensor (10) of claim 16,
wherein the initial values are determined by a calibration measurement in a reference state of the monitoring area (20).

19. The sensor (10) of claim 18,
wherein the initial values are determined by a calibration measurement to initialize with a front screen reflection and thus compensate for it.

20. A method for the detection and distance determination of objects in a monitoring area (20), wherein a transmission light beam (16) with a plurality of successive individual light pulses (54) is transmitted, the transmission light beam (16) scans the monitoring area (20) by periodic deflection, and reception pulses (102) are generated from the transmission light reflected or remitted from objects in the monitoring area (20), wherein the angle of deflection is determined by an angular position signal (58), a plurality of reception pulses (102) is collected in a time histogram (110) and the light time of flight to an object is determined from the histogram (110) and, from that, a measured value for the object distance is determined, wherein a respective group (56) of reception pulses (102) that is collected in a histogram (110) is selected based on the angular position signal (58), and the measured value for the object distance determined from the histogram (110) of the group (56) is assigned to a detection angle identified by the angular position signal (58), and wherein an evaluation unit (32) is configured to make the selection of reception pulses (102) to a group (56) with a time delay.

21. A method for the detection and distance determination of objects in a monitoring area (20), wherein a transmission light beam (16) with a plurality of successive individual light pulses (54) is transmitted, the transmission light beam (16) scans the monitoring area (20) by periodic deflection, and reception pulses (102) are generated from the transmission light reflected or remitted from objects in the monitoring area (20), wherein the angle of deflection is determined by an angular position signal (58), a plurality of reception pulses (102) is collected in a time histogram (110) and the light time of flight to an object is determined from the histogram (110) and, from that, a measured value for the object distance is determined, wherein a respective group (56) of reception pulses (102) that is collected in a histogram (110) is selected based on the angular position signal (58), and the measured value for the object distance determined from the histogram (110) of the group (56) is assigned to a detection angle identified by the angular position signal (58), and wherein an evaluation unit (32) is configured to adapt the number of reception pulses (102) in a group (56) in dependence on at least one of the detection angle and an object distance previously determined.

\* \* \* \* \*